(12) United States Patent
Yang et al.

(10) Patent No.: US 12,242,577 B2
(45) Date of Patent: Mar. 4, 2025

(54) SOUND-BASED USER LIVENESS DETERMINATION

(71) Applicant: Lenovo (Singapore) Pte. Ltd., Singapore (SG)

(72) Inventors: Zhenyu Yang, Dayton, OH (US); Ming Qian, Cary, NC (US); Jianbang Zhang, Cary, NC (US); Song Wang, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 730 days.

(21) Appl. No.: 16/588,679

(22) Filed: Sep. 30, 2019

(65) Prior Publication Data

US 2021/0097160 A1  Apr. 1, 2021

(51) Int. Cl.
*G06F 21/32* (2013.01)
*G06F 21/10* (2013.01)

(52) U.S. Cl.
CPC .......... *G06F 21/32* (2013.01); *G06F 21/1015* (2023.08)

(58) Field of Classification Search
CPC ................................ G06F 21/32; G06F 21/10
See application file for complete search history.

(56) References Cited

U.S. PATENT DOCUMENTS

| 2002/0191817 | A1* | 12/2002 | Sato ..................... G07C 9/38 382/118 |
| 2016/0034901 | A1* | 2/2016 | Ferren ................ G06F 3/0236 705/44 |
| 2016/0275518 | A1* | 9/2016 | Bowles ............. G06V 40/1365 |
| 2017/0180348 | A1* | 6/2017 | Piccolotto ............ G06V 40/45 |
| 2018/0075295 | A1* | 3/2018 | Yamaguchi .......... G06K 9/0061 |
| 2018/0154253 | A1* | 6/2018 | Peterson ............... A63F 13/355 |

* cited by examiner

*Primary Examiner* — Ellen Tran
(74) *Attorney, Agent, or Firm* — FERENCE & ASSOCIATES LLC

(57) ABSTRACT

One embodiment provides a method, including: receiving, at an information handling device, a request from a user to access content; detecting, using at least one sensor associated with the information handling device, a face of the user; generating, using at least one audio output device and subsequent to the detecting, an audible sound; determining, using a processor, whether an expected movement of the face is identified with respect to the audible sound; and granting, responsive to determining that the expected movement is identified, the user access to the content. Other aspects are described and claimed.

16 Claims, 3 Drawing Sheets

SOUND-BASED USER LIVENESS DETERMINATION

BACKGROUND

Information handling devices ("devices"), for example smart phones, tablet devices, smart speakers, laptop and personal computers, and the like, may have measures in place to authenticate a user prior to granting that user access to content on the device (e.g., access to a user profile, access to an application, etc.). For example, authentication mechanisms may include password authentication (e.g., provided via keyboard input, touch input, audible input, etc.), fingerprint identification, voice authentication, face authentication, and the like. Responsive to authenticating a user, a device may thereafter grant the user access to the requested content.

BRIEF SUMMARY

In summary, one aspect provides a method, comprising: receiving, at an information handling device, a request from a user to access content; detecting, using at least one sensor associated with the information handling device, a face of the user; generating, using at least one audio output device and subsequent to the detecting, an audible sound; determining, using a processor, whether an expected movement of the face is identified with respect to the audible sound; and granting, responsive to determining that the expected movement is identified, the user access to the content.

Another aspect provides an information handling device, comprising: at least one sensor; at least one audio output device; a processor; a memory device that stores instructions executable by the processor to: receive a request from a user to access content; detect a face of the user; generate an audible sound; determine whether an expected movement of the face is identified with respect to the audible sound; and grant, responsive to determining that the expected movement is identified, the user access to the content.

A further aspect provides a product, comprising: a storage device that stores code, the code being executable by a processor and comprising: code that receives a request from a user to access content; code that detects a face of the user; code that generates an audible sound; code that determines whether an expected movement of the face is identified with respect to the audible sound; and code that grants, responsive to determining that the expected movement is identified, the user access to the content.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
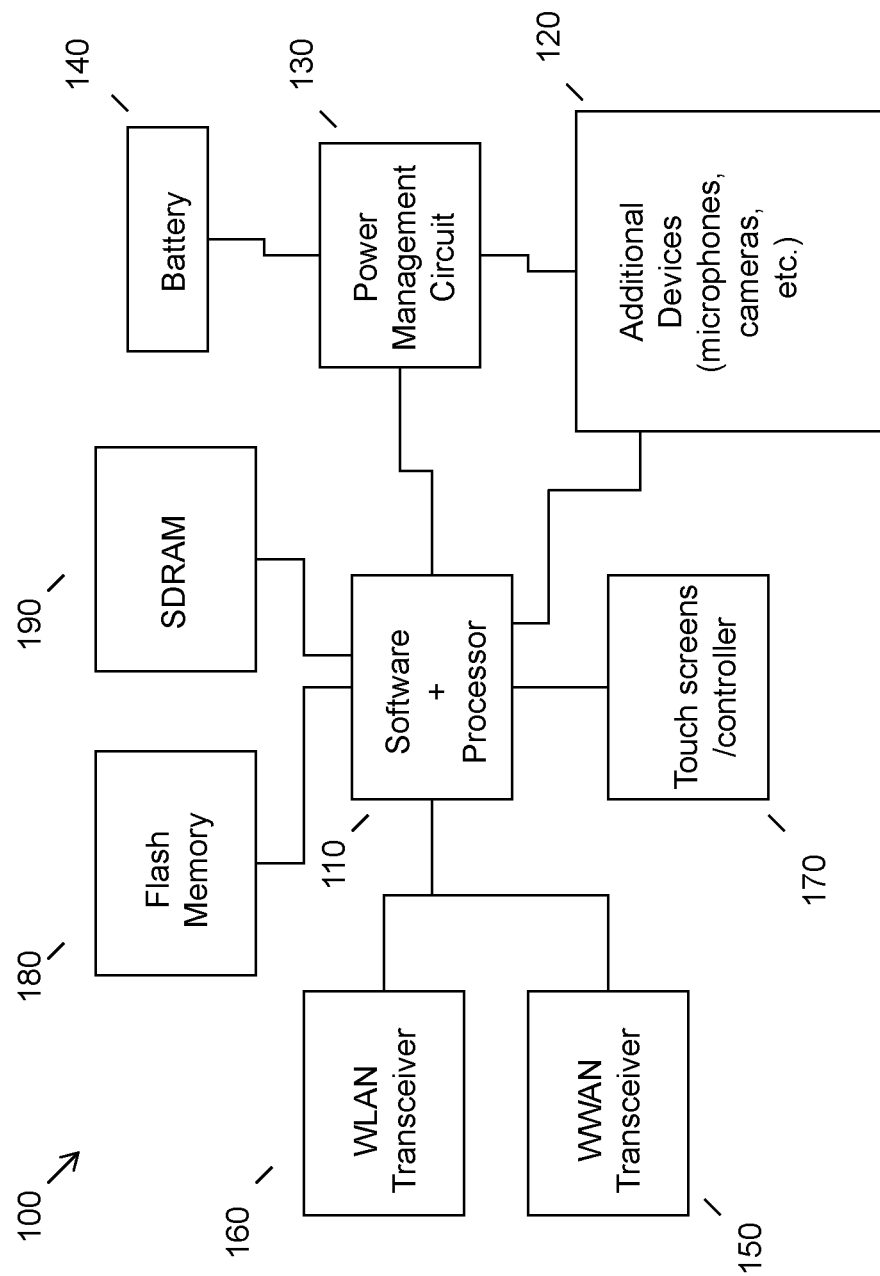
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A plurality of authentication techniques exist that aim to determine the identity of an individual prior to granting that individual access to requested content. For example, many authentication systems employ facial recognition technologies that are utilized to analyze an individual's facial contours to identify particular patterns. A requirement of this technique is that a front-facing image be captured of the requesting individual, which is then compared to a stored image of an authorized individual. This step alone may deter bad actors from attempting to gain access to restricted content because they do not want to use their own image and share it with the organization they are looking to defraud.

Although these conventional technologies are relatively successful, they tend to be easily spoofed, thereby leading to a greater security risk. For example, a bad actor may place a printed photo of an authorized user in front of a camera of the device in an attempt to trick the device to unlock or to grant them access to a particular application. As another example, a bad actor may use pre-recorded videos of an authorized user and/or 3D masks of the authorized user to attempt to spoof the system.

Therefore, another part of the image capture process includes a test for liveness to ensure that a requesting individual is physically present during the transaction and is not just an artificial object or lifeless person. This is done to better thwart bad actors that are increasingly using the aforementioned spoofing attacks to acquire an authorized individual's privileges or gain access to their rights. For example, a popular liveness test requires an individual to perform certain head/facial movements to prove their liveness (e.g., turning face to the left or right, nod, blink eyes, open mouth, etc.). However, such liveness detection requires full cooperation from the user (e.g., the user has to be aware that the test is occurring and must be willing to perform the requested movements, etc.). Occasions arise where it may not be convenient for the user to do this. Additionally, it may be easier for a bad actor to prepare attacks if they are aware of the existence of this liveness detection.

Accordingly, an embodiment provides a method of subtle user authentication using audible sounds. In an embodiment, a request from a user to access content may be received (e.g., a login request, a request to access sensitive content, etc.). Subsequent to receiving the request, an embodiment may detect a face of the user and then generate an audible sound. The audible sound may be generated by the user's device or may be generated by another device (e.g., another device in an TOT system in communication with the user's device, etc.). Thereafter, an embodiment may determine if the user performed an expected movement responsive to the audible sound. For example, an embodiment may determine if a user turned toward the audible sound. Responsive to determining that the expected movement was performed, an embodiment may grant the user access to the requested content. Such a method may allow a system to subtly determine the liveness of a user.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
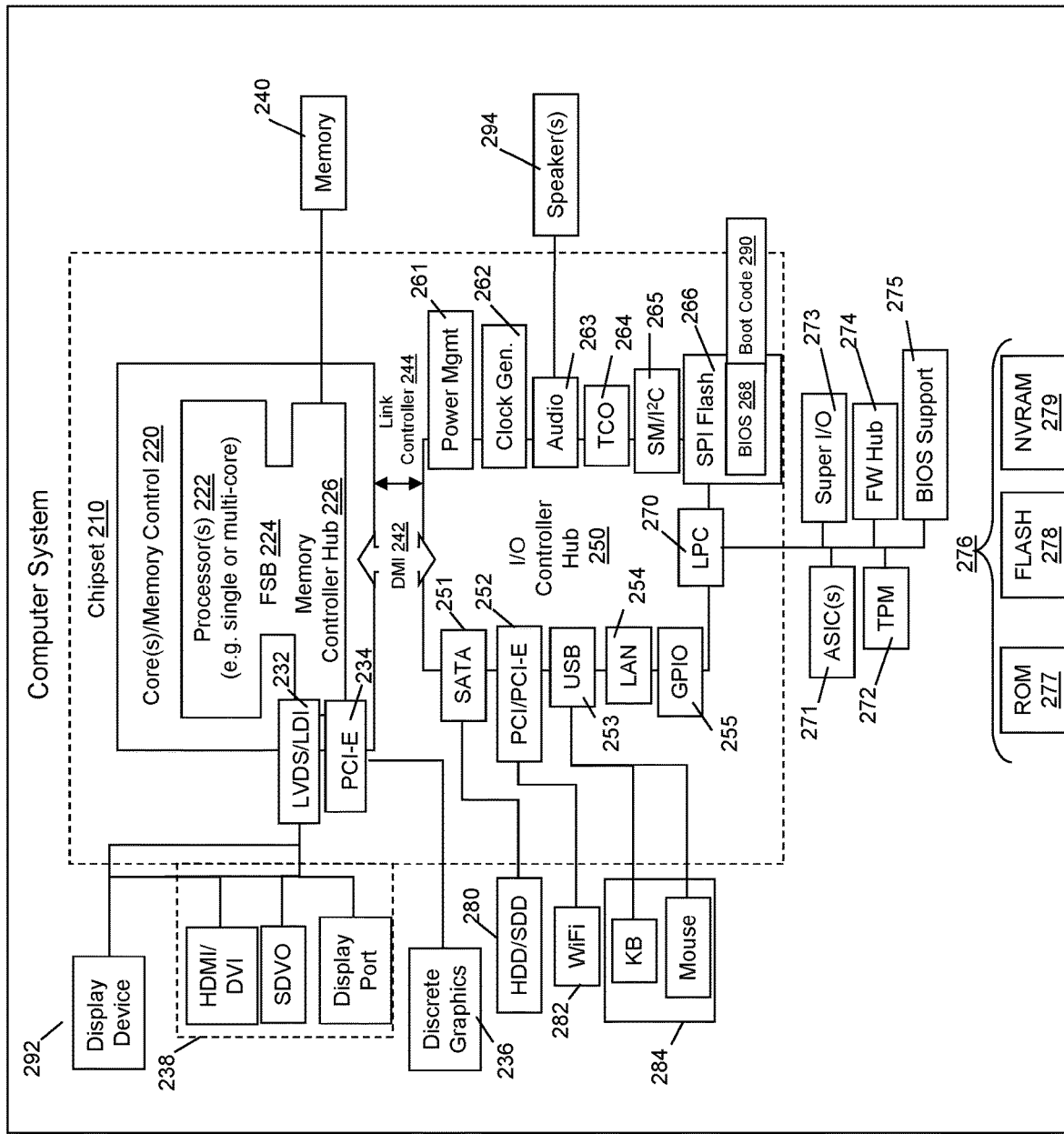
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of performing facial recognition techniques and/or outputting audible sounds. For example, the circuitry outlined in FIG. 1 may be implemented in a smart phone or tablet embodiment, whereas the circuitry outlined in FIG. 2 may be implemented in a laptop.

Figure 3:
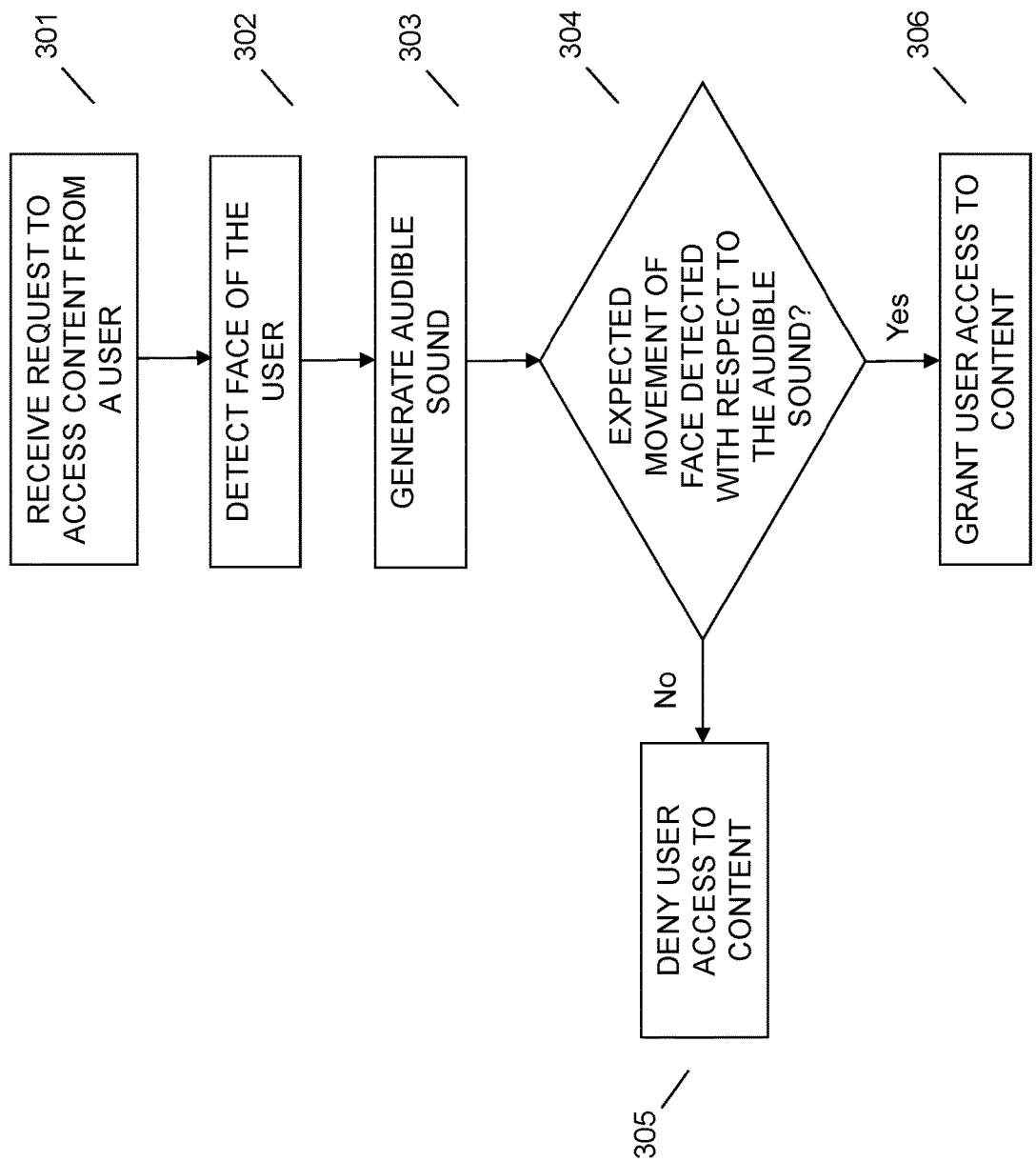
FIG. 3 illustrates an example method of detecting a liveness of a user using audible sounds.

Referring now to FIG. 3, an embodiment may determine the liveness of a user by utilizing audible sounds. At 301, an embodiment may receive a request from a user to access content on a device. The request may be identified via the detection of one or more types of physical user selection inputs (e.g., touch input, stylus input, keyboard input, etc.) directed toward a virtual object displayed on the device (e.g., an application icon, a login overlay, a website link, a search engine, etc.) or one or more types of non-physical user selection inputs (e.g., voice input, gesture input, etc.) directed toward a capability of the device (e.g., data retrieval capability, etc.). In an embodiment, the content may be virtually any type of content, e.g., home screen information, non-sensitive content (e.g., weather data, sports data, news data, etc.), sensitive content (e.g., bank account information, personal user information, high priority/work documents, etc.), and the like.

In an embodiment, the subsequent processes may be initiated only in response to the detection of a sensitive content request. Stated differently, an embodiment may allow a user to access non-sensitive content without performing any type of liveness or authentication test. Conversely, responsive to detecting a user request to access sensitive content, an embodiment may attempt to authenticate the user using the techniques described herein. An embodiment may access a listing of sensitive and/or non-sensitive content types (e.g., located in an accessible database stored locally on the device or stored remotely on another device or server, etc.). The listing may have been originally programmed by a manufacturer and may thereafter be adjusted by a user.

At 302, an embodiment may detect a face of the user. In an embodiment, the detection of the face may be facilitated by utilizing one or more image processing techniques and/or face recognition techniques conventionally known in the art. The actual image capture may be facilitated by using one or more sensors (e.g., camera sensors, etc.) integral to the user's device or one or more sensors integral to another device that is in communication with the user's device. For example, with respect to the latter, the user's device may be part of an Internet of Things (IOT) system in which information is actively shared between devices in the system (e.g., via a wired or wireless connection, etc.).

At 303, an embodiment may generate an audible sound. The audible sound may be generated in response to receiving the request to access content or in response to the detection of the user's face. In an embodiment, the audible sound may be generated by one or more audio output devices (e.g., speakers, etc.) integral to the user's device or integral to another sound-producing device (e.g., a dedicated speaker, another individual's device, etc.) that is in communication with the user's device. With respect to the latter, an indication to generate an audible sound may be transmitted from the user's device to the other sound-producing device. As a non-limiting example, a user may wear a three-dimensional (3D) sound producing headset while interacting with a laptop computer. The laptop computer may transmit indications to the headset (e.g., via a wired or wireless connection, etc.) to produce sounds at the relevant moments. As another non-limiting example, the audible sound(s) may be generated by one or more audio output devices located in the vicinity of the user. For instance, an audible sound may be generated by a dedicated speaker located to the user's periphery (e.g., to the user's left, right, etc.).

In an embodiment, the selection of the audio-producing device(s) from which to emit the sound(s) may be chosen to facilitate a meaningful and measurable movement of the user's face. Stated differently, the sound should be derived from a location that demands a user to turn their face, or to adjust their visual focus, to acknowledge the sound. Accordingly, an embodiment may identify a direction that a user is facing and thereafter emit a sound from a different direction.

In an embodiment, the audible sound may be virtually any type of sound (e.g., an artificial sound such as beeping, a real world sound that mimics a thing or person, etc.). In an embodiment, the audible sound may be a distinct sound that may be differentiable from other sounds in the user's environment. For example, if an embodiment determines that a user is located in a rural area (e.g., using one or more location determination techniques, etc.) an embodiment may choose to play a sound that is uncommon to that area (e.g., a car horn honking instead of crickets chirping, etc.). In an embodiment, the sound(s) may be stored and accessed from a sound database (e.g., stored locally on the device or stored remotely on another device, etc.). The duration of the sound may be virtually any length but, for practical purposes, is generally expected to be relatively short (e.g., half a second, one second, two seconds, etc.).

In an embodiment, the audible sound(s) may be a plurality of the same or different sounds sequentially emitted from the same or different sound producing devices. For example, an embodiment may emit a series of three sounds wherein the first sound is emitted by a device to the user's left, the second sound emitted by a device to the user's right, and the third sound emitted by a device positioned above the user. In an embodiment, the emission of the next sound in the series may only be effectuated responsive to detecting that the user has acknowledged the last sound (e.g., by turning their face toward a direction of the last sound, etc.). In an embodiment, the number of sounds, the types of sounds, the series of sounds, and the devices and/or the directions the sounds are emitted from may vary each time the underlying process is executed. For example, an embodiment may randomly generate a different patterned series each time step 303 is encountered.

At 304, an embodiment may determine whether an expected movement of the face is identified with respect to the audible sound. The expected movement may correspond to an adjustment of the face, an adjustment of the user's visual focus, or another movement indicating user acknowledgement of the sound. For example, the expected movement may amount to a turning of the face and/or eyes toward the sound. In situations where there are a series of sounds, the expected movement may correspond to a plurality of expected movements, wherein each expected movement is a turn of the user's face toward the most recently emitted sound. To identify the expected movement, an embodiment may use one or more image or video capture devices to record a user's actions and thereafter compare the user's reaction to the sound to an expected movement with respect to that sound.

Responsive to determining, at 304, that the expected movement is not identified, an embodiment may, at 305, deny the user access to the content. Additionally or alternatively, if the same or substantially similar user request is received again after step 304 fails, an embodiment may provide a notification to the user to monitor for a particular sound and/or to perform a specific action in response to the sound. Conversely, responsive to determining, at 305, that the expected movement is identified, an embodiment may, at 306, grant the user access to the content. Additionally or alternatively, an embodiment may only grant the user access to the requested content responsive to determining that the expected movement was identified and that predetermined credentials were received. For example, an embodiment may require the user to pass the liveness detection techniques described herein along with a specific passcode prior to granting the user access to certain content (e.g., sensitive content, etc.).

The various embodiments described herein thus represent a technical improvement to conventional methods for determining the liveness of a content-requesting user. Using the techniques described herein, an embodiment may first receive a request from a user to access content. An embodiment may then detect a face of the user using one or more conventional face detecting technologies and thereafter generate an audible sound using one or more sound producing devices. Responsive to determining that the user's face performs an expected movement or action with respect to the generated sound, an embodiment may grant the user access to their requested content. Such a technique provides a subtle way to determine the liveness of the user and provides an additional level of confirmation that the requesting user is an authorized user.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, a request from a user to access sensitive content;
   detecting, using at least one sensor associated with the information handling device, a face of the user;
   generating, using at least one audio output device, responsive to the request to access content, and subsequent to the detecting, an audible sound to authenticate the user, the audible sound being generated from a particular direction being a direction other than a direction the face of the user is facing;
   determining, using a processor and the at least one sensor, that an expected movement of the face is identified with respect to the audible sound, wherein the expected movement indicates at least an acknowledgment of the audible sound by the user and wherein the expected movement comprises identifying the face of the user turns toward the particular direction; and
   granting, responsive to determining that the expected movement is identified, the user access to the sensitive content.

2. The method of claim 1, wherein the at least one audio output device is integral to another device and wherein the generating comprises transmitting an indication to the another device to generate the audible sound.

3. The method of claim 2, wherein the another device is a three-dimensional (3D) sound-producing headset.

4. The method of claim 1, wherein the audible sound corresponds to a pattern of sounds.

5. The method of claim 4, wherein the pattern is randomly generated.

6. The method of claim 4, wherein the determining comprises identifying whether the face turns toward each sound in the pattern.

7. The method of claim 1, further comprising providing, subsequent to the detecting, a notification to the user to monitor for the audible sound.

8. The method of claim 1, wherein the audible sound is dynamically selected based upon an environment of the user.

9. An information handling device, comprising:
- at least one sensor;
- at least one audio output device;
- a processor;
- a memory device that stores instructions executable by the processor to:
- receive, at the information handling device, a request from a user to access sensitive content;
- detect, using the at least one sensor, a face of the user;
- generate, using the at least one audio output device, responsive to the request to access content, and subsequent to the detecting, an audible sound to authenticate the user, the audible sound being generated from a particular direction being a direction other than a direction the face of the user is facing;
- determine, using the at least one sensor, that an expected movement of the face is identified with respect to the audible sound, wherein the expected movement indicates at least an acknowledgment of the audible sound by the user and wherein the expected movement comprises identifying that the face of the user turns toward the particular direction; and
- grant, responsive to determining that the expected movement is identified, the user access to the sensitive content.

10. The information handling device of claim 9, wherein the instructions executable by the processor to generate comprise instructions executable by the processor to transmit an indication to another device to generate the audible sound.

11. The information handling device of claim 10, wherein the another device is a three-dimensional (3D) sound-producing headset.

12. The information handling device of claim 9, wherein the audible sound corresponds to a pattern of sounds.

13. The information handling device of claim 12, wherein the pattern is randomly generated.

14. The information handling device of claim 12, wherein the instructions executable by the processor to determine comprise instructions executable by the processor to identify whether the face turns toward each sound in the pattern.

15. The information handling device of claim 9, wherein the instructions are further executable by the processor to provide, subsequent to the detecting, a notification to the user to monitor for the audible sound.

16. A product, comprising:
- a storage device that stores code, the code being executable by a processor and comprising:
- code that receives a request from a user to access sensitive content;
- code that detects a face of the user;
- code that generates, responsive to the request to access content and subsequent to the detecting, an audible sound to authenticate the user, wherein the audible sound is dynamically selected based upon an environment of the user, the audible sound being generated from a particular direction being a direction other than a direction the face of the user is facing;
- code that determines that an expected movement of the face is identified with respect to the audible sound, wherein the expected movement indicates at least an acknowledgment of the audible sound by the user and wherein the expected movement comprises identifying that the face of the user turns toward the particular direction of the audible sound; and
- code that grants, responsive to determining that the expected movement is identified, the user access to the sensitive content.

* * * * *